United States Patent [19]

Ogilvie

[11] 4,245,619

[45] Jan. 20, 1981

[54] SOLAR ENERGY COLLECTION PANEL

[76] Inventor: Michael B. Ogilvie, P.O. Box 357, Moss Beach, Calif. 94038

[21] Appl. No.: 969,211

[22] Filed: Dec. 13, 1978

[51] Int. Cl.³ .............................. F24J 3/02; F24J 3/14
[52] U.S. Cl. ...................................... 126/444; 126/450
[58] Field of Search ............... 126/442, 443, 444, 449, 126/450; 165/171, 170; 237/1 A

[56] References Cited

U.S. PATENT DOCUMENTS

| | | | |
|---|---|---|---|
| 3,076,450 | 2/1963 | Gough et al. | 126/444 |
| 3,965,887 | 6/1976 | Gramer et al. | 126/444 |
| 3,995,615 | 12/1976 | Hojnowski | 126/444 |

Primary Examiner—George T. Hall

Attorney, Agent, or Firm—C. Michael Zimmerman

[57] ABSTRACT

A solar energy collection panel is described for collecting solar energy to heat water. The panel is a simple, two component arrangement. That is, a cast, one piece construction provides a combined base and frame for the panel and defines the bottom and side walls of a plurality of separate channels for the flow of water to be heated directly by solar radiation. A double paned transparent sheet overlies the combined base and frame, forming the top wall of the channels to enclose the same for water flow while permitting direct impingement on the water of solar radiation passing therethrough. The transparent sheet is rigid to impart structural rigidity to the panel.

7 Claims, 2 Drawing Figures

SOLAR ENERGY COLLECTION PANEL

BACKGROUND OF THE INVENTION

The present invention relates to a means for heating fluid with solar radiation, and more particularly to a solar panel to collect thermal energy from the sun.

Due to the present energy situation, in which the cost of fossil fuel is increasing substantially and inventories of fuel are dwindling, there has been increasing emphasis on extracting thermal energy from alternative energy sources. One such alernative source is solar radiation.

Solar radiation has advantages as a source of thermal energy with respect to conventional fossil fuels. For example, the supply of solar radiation is practically unlimited; whereas fossil fuel sources are diminishing and eventually will be exhausted. Also, solar radiation can be tapped by individual homeowners without dependence upon large, centralized distribution sources such as electrical generating facilities, virtually outside the control of the homeowner. Frequent blackouts and rate increases illustrate problems of such centralized distribution which can be avoided by the homeowner utilizing solar power. However, for the individual homeowner to be able to take advantage of a solar energy system, the capital cost of the system must be low; operation must be cost-efficient; and it must be easy to install.

Solar energy collector panels are now available designed to convert solar energy into thermal energy. Most panels of this type include an absorber plate made of metal or some other high thermally conductive material which receives the solar radiation. The absorber plate intercepts solar radiation and converts a portion of it into thermal energy. The solar panels described in U.S. Pat. Nos. 3,995,615; 4,038,967; 4,048,981; 4,049,046 are examples of panels which rely on use of such an intermediate metallic or other conductive plate. A heat transfer fluid, e.g., a liquid such as water, is passed along the absorber plate in direct thermal contact therewith, such as in channels which are formed in or on the plate, to convey the thermal energy from the plate for use to heat, for example, a swimming pool or living space.

Other solar panels have been designed which, rather than relying on an intermediate absorber plate, include a shaped, metallic sheet providing a reflective surface to intercept the solar radiation and reflect it to a fluid to be heated. The collector described in French Pat. No. 76 34055 (publication no. 2 334 069) is an example of such a collector. Collectors of this type are not widely used in view of the relatively inefficient method by which the solar radiation is converted to thermal energy.

It will be seen from the above that most solar collection panels include a metal sheet, either to utilize the solar-absorptive and thermal-conductive properties of the metal, or the reflective properties thereof. Metal, however, is relatively heavy and often expensive. Most solar panels also include a metal frame to provide structural rigidity.

SUMMARY OF THE INVENTION

An object of the present invention is to provide a relatively inexpensive and yet effective solar panel to collect thermal energy from solar radiation. In this connection, the panel of the invention eliminates the need for a metal frame or a metal collecting or reflecting plate. In basic terms, the panel of the invention includes only two main components, a combined base and frame defining channels providing a path for fluid flow, and a transparent sheet overlying the combined base and frame and forming a top wall for the channels to enclose the same for fluid flow while permitting direct impingement on the fluid of solar radiation which passes therethrough.

As a particularly salient feature of the instant invention, the combined base and frame are of a cast, one piece construction, and the structural rigidity for the panel is provided by the transparent sheet means rather than, for example, a metal frame. Reliance on the transparent sheet to provide the structural rigidity required by the panel eliminates the need for a rigid frame and its attendant weight and relatively high cost. Most desirably, the light weight, non-metallic material from which the combined base and frame is cast, is a thermosetting polyester resin having an inorganic filler, such as fiberglass. While typically such a material will not provide the base of the panel with the structural rigidity normally associated with such a panel, the recognition by the inventor that the transparent sheet can itself act as a structural member makes viable the use of such a plastic material for the base and eliminates the need for a metal frame.

The panel of the invention is designed to provide direct thermal heating of the fluid which flows in the channels, thereby obviating the need for a metal collecting or reflecting plate. Most desirably, the fluid which is directly heated is water. While this heating method may not be as efficient as the use of a metal collecting plate, the low cost and light weight associated with the panel of the invention enables a greater number of panels to be used covering a greater surface area in any given installation.

The elimination of a metal collecting or reflecting plate also eliminates the need for direct contact between metal and the fluid. This obviates the possibility of contamination of the fluid by metal corrosion. Thus, when the fluid is water, the water can be directly used in a swimming pool or as a source of potable water, without the need for an intermediate heat exchanger.

Most desirably, the panel of the invention also includes good thermal insulation to prevent escape of the thermal energy from the heated fluid. To this end, the transparent sheet means preferably is provided as a pair of spaced apart, generally parallel transparent plates of, for example, glass, forming a dead air space to provide thermal insulation at the top wall of the panels. A thermal insulating material, such as a rigid expanded foam plastic material, is applied to the bottom surface of the cast base and frame, opposite the channels through which the heated fluid is to flow. Also, the fluid channels preferably are communicated with one another to form a serpentine path for fluid flow through the panel. This will result in a relatively long residence time for the fluid in the panel. The invention includes other features and advantages which will be described or will become apparent from the following more detailed description of a preferred embodiment.

BRIEF DESCRIPTION OF THE DRAWING

With reference to the accompanying single sheet of drawing.

DETAILED DESCRIPTION OF A PREFERRED EMBODIMENT

Figure 1:
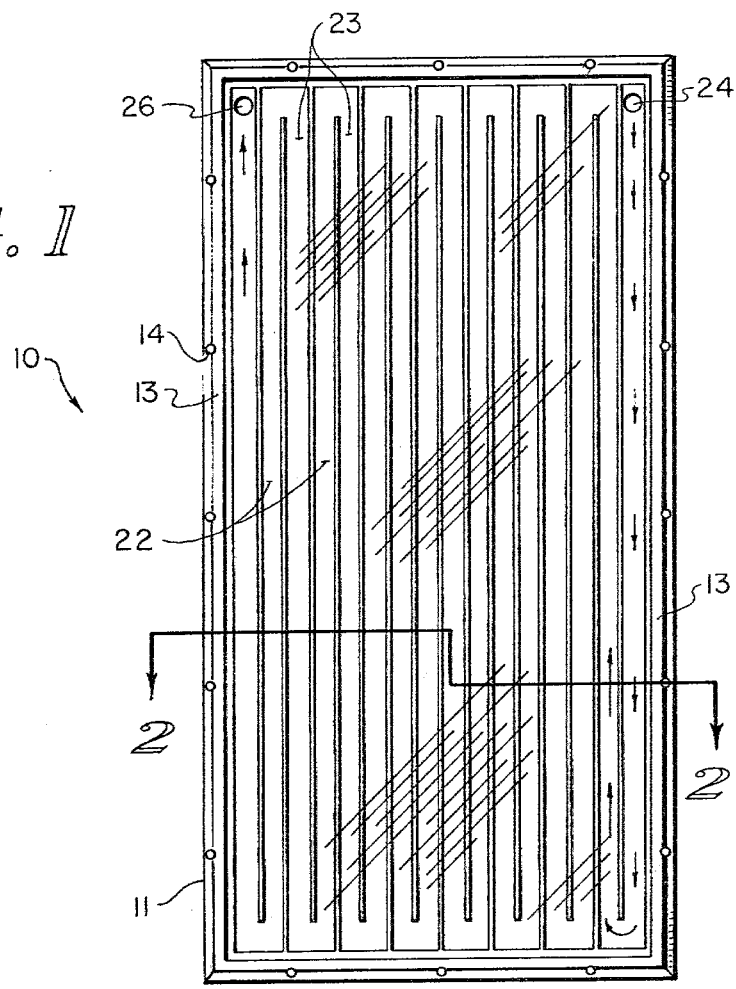
FIG. 1 is a plan view of a preferred embodiment of the solar collection panel.

A preferred embodiment of the panel of the invention is referred to in the drawings in an overall manner by the reference numeral 10. Panel 10 consists primarily of two main components, one of which is a cast body 11 providing both the base and frame for the panel, the other of which is a rigid, transparent sheet arrangement 12 which forms the main structural component of the panel. Body 11 defines, as is illustrated, a peripheral frame 13 of the panel. Frame 13 is rectangular in plan view and includes spaced along its length, cavities 14 designed to receive fasteners, such as screws 16, to secure the panel to a backing member which is, for example, the roof of a dwelling. If desired, frame 13 can also include suitable means for securing a transparent cover or the like over the panel to protect sheet arrangement 12 from damage.

Body 11 also defines the panel base. That is, there is integral with the frame 13 and extending for its full width and length a base structure 17. The upper surface of structure 17 defines the bottom wall 18, and side walls 19 and 21 of a plurality of separated channels for the flow of fluid to be heated directly by solar radiation. Adjacent ones of these channels are referred to alternately by the reference numerals 22 and 23.

As previously mentioned, the solar panel of the invention is designed to have thermal energy imparted to a fluid medium by direct impingement of solar radiation onto the medium. Thus, it is most desirable that the fluid medium have a long residence time within the panel, i.e., be exposed to the solar radiation for a relatively long time. The channels are so arranged within the panel that such a long residence time is achieved. More particularly, the channels 22 and 23 are generally parallel to one another with each communicating respectively at its opposite ends with its two adjacent channels. Channels 22 and 23 thus form a serpentine path for water flow through the panel, as is illustrated in FIG. 1. In this connection, a fluid flow inlet 24 is provided at one end of the end channel on one side of the panel, whereas a fluid outlet 26 is provided at a corresponding end of the opposite end channel. Fluid exiting one panel can, of course, be introduced into an adjacent panel to extend the time during which the fluid is exposed to solar radiation. In this connection, when a panel is designed to rely on the application of thermal energy to a fluid by direct exposure to solar radiation, the efficiency of transmission of thermal energy to the fluid is not affected as adversely by an increase in the thermal energy of the fluid, as it would be if an intermediate, conductive absorber plate was utilized.

Most desirably, the heat transfer medium utilized with the panel of the invention is water. Because the panel does not include any metallic members within which the heat transfer fluid (water) would come into contact, the possibility of such water being contaminated in its passage through a panel or panels of the invention is significantly reduced. Thus, water which is to be used directly, such as in a swimming pool, can be circulated through the panels to be heated. That is, it is not necessary that an intermediate heat exchanger be utilized to separate the water which is circulated through the panels from water which is to be utilized. Potable water to be heated can also be directly circulated through the panel. Potable water and water for a swimming pool have in common the fact that they are both intended to be in direct contact with humans.

The bottom walls 18 of all the channels are generally in the same plane and spaced from the bottom surface of the transparent sheet arrangement a significant distance, e.g., one and one-half inches. The side walls 19 and 21 of each of the channels extends upward from the bottom wall thereof to the transparent sheet arrangement. As illustrated, each of such side walls extends outwardly from the bottom wall to form an acute angle with the transparent sheet. The result is that they face the transparent sheet arrangement obliquely to intercept along with the channel bottom wall any solar radiation which is transmitted through such arrangement. In this connection, each of the side wall surfaces forms an angle of about 60° with the generally planar, bottom surface of the transparent sheet arrangement.

As an important feature of the instant invention, the combined base and frame body is designed to be made by mass production techniques, i.e., cast as a one piece construction. Such casting can be by way of, for example, chopper gun blow-up casting for short production runs, or cold mold casting for long production runs. In this connection, the term "casting" as used herein is meant to encompass the concept of molding, including molding within a generally closed mold such as by way of injection molding.

The combined base and frame member 11 most desirably is cast from a light weight, non-metallic material resistant both to solar radiation degradation and the corrosive effects, if any, of the fluid which will flow through the panel. When the fluid is water, it has been found that a thermosetting polyester resin having an inorganic filler such as POLYGLAS, is a quite satisfactory material.

Figure 2:
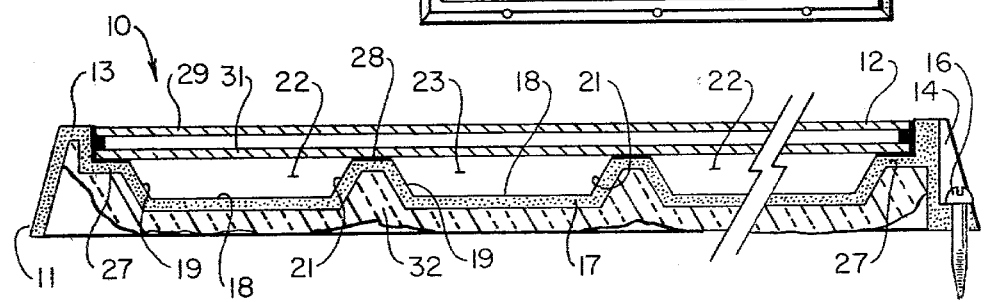
FIG. 2 is a cross-sectional view of the solar panel of FIG. 1, taken along a plane indicated by lines 2—2.

The transparent sheet arrangement 12 overlies the combined base and frame and forms the top wall of each of the channels. Thus, it has several functions, i.e., it partially defines the channels and also permits direct impingement of solar radiation on the fluid which flows as well as provides structural rigidity to the overall panel. In more detail with respect to the structure, the frame 13 includes about its periphery an inwardly extending shelf 27 upon which the edges of the transparent sheet rests and to which such sheet is suitably bonded. As can be seen from FIG. 2, the contiguous side walls of adjacent channels terminate in a flat surface 28 to which the transparent arrangement sheet 12 is also bonded preferably for substantially the full length of each of the surfaces 28. Most desirably, the width of the surfaces 28 is kept to a minimum consistent with good bonding with the sheet arrangement in order to assure that as much of the area beneath the transparent sheet arrangement 12 is practical is available for receipt of solar radiation by the fluid to be heated.

As can be seen from FIG. 1, the result of the above will be that the combined base and frame member will be bonded throughout its full extent to the underneath surface of the transparent sheet arrangement 12. Thus, the structural rigidity of sheet arrangement 12 is imparted to the body 11 throughout its full extent. Thus, except for the peripheral frame 13, such body 11 need not itself have much more structural strength than is necessary to be self supporting. In this connection, it should be noted that the panel of the invention is designed to be secured to a backing, such as a roof or the like.

Transparent sheet arrangement 12 most desirably is selected to provide thermal insulation across the top of the channels 22 and 23. To this end, it preferably includes a pair of spaced apart, generally parallel transparent plates or panes 29 and 31 forming a dead air space therebetween. As is known, such a double glazing arrangement will provide thermal insulation. Most desirably, the panes are of glass and the transparent sheet arrangement is provided as a preassembled structure which simply can be bonded to the body 11 to form the panel. Such a double glazed structure commonly is available for windows and the like, e.g., the structure referred to by the trademark THERMOPANE.

To complete insulation of the panel, it includes a thermal insulating material on the bottom surface of its base, is as illustrated. The insulated material can be, for example, a rigid cellular plastic material forming a blanket 32 adhered to the bottom surface of the base structure. In the alternative, the base structure could be cast with a sufficient thickness to provide thermal insulation.

The surfaces of the channels 22 and 23 provided by the combined base and frame, i.e., the bottom and side walls of each of such channels, most desirably are coated with a material which will convert solar radiation impinging thereon to thermal energy. That is, such surfaces preferably are coated either with a selective radiation surface or with a material of a dark color. Thus, any solar radiation convertible to thermal energy which passes through the fluid will be converted to thermal energy by the channel structure which will in turn conductively impart the same to the fluid. The provision of insulating blanket 32 on the underneath sides of the channels will aid in this regard, by assuring that the thermal energy will be preferentially directed to the heat transfer fluid. It is important that the coating material which is selected be one which will not cause contamination of such fluid.

The invention has been described in connection with the best mode contemplated by the inventor for carrying it out. It will be recognized by those skilled in the art, though, that various changes and modifications can be made without departing from its spirit. It is therefore intended that the coverage afforded applicant be llimited only by the claims and their equivalent language.

I claim:

1. A relatively inexpensive yet effective solar panel to collect thermal energy from solar radiation comprising:

a cast, one piece body of a lightweight, non-metallic material providing a combined base and frame having an upper surface defining the bottom and side walls of a plurality of separated channels for the flow of fluid to be heated directly by solar radiation; and a structurally rigid transparent sheet means secured to said body overlying said separated channels and forming the top walls thereof to enclose the same for fluid flow while permitting direct impingement on said fluid of solar radiation passing through said transparent sheet means, said transparent sheet means being secured to said body at spaced locations thereon to impart its structural rigidity thereto and, hence, to said panel.

2. A solar panel according to claim 1 wherein said light weight, non-metallic material is a thermosetting polyester resin having an inorganic filler.

3. A solar panel according to claim 1 further including a material providing thermal insulation applied to the bottom surface of said combined base and frame opposite said plurality of separated channels, and said transparent sheet means comprises a pair of spaced apart, generally parallel transparent plates forming a dead air space therebetween providing thermal insulation at the top wall of each of said separated channels.

4. A solar panel according to claim 1 wherein said fluid for which said panel is designed is water, and said separated channels have significant depth to provide for the flow of a significant depth of water therethrough to convert solar radiation into thermal energy and absorb same.

5. A solar panel according to claim 1 further including a coating on the surfaces of said bottom and side walls of said channels, which coating is of a material which converts solar radiation impinging thereon to thermal energy.

6. A solar energy panel according to claim 5 wherein the surfaces of said channel side walls having said coating form an acute angle with said transparent sheet means to face the latter obliquely for interception of solar radiation transmitted therethrough.

7. A solar energy panel according to claim 1 wherein said transparent sheet means is bonded to said body at the peripheral edges of said sheet means and intermediate of said edges at locations where said sheet means contacts said body to enclose said separated channels.

* * * * *